United States Patent [19]

Hubbard et al.

[11] Patent Number: 4,605,939

[45] Date of Patent: Aug. 12, 1986

[54] INK JET ARRAY

[75] Inventors: David W. Hubbard, Stamford; Frank E. Seestrom, Weston, both of Conn.

[73] Assignee: Pitney Bowes Inc., Stamford, Conn.

[21] Appl. No.: 771,523

[22] Filed: Aug. 30, 1985

[51] Int. Cl.[4] .................... G01D 15/18

[52] U.S. Cl. .................... 346/140 R; 310/331

[58] Field of Search .................... 346/140, 75; 310/330, 310/331

[56] References Cited

U.S. PATENT DOCUMENTS

| | | | |
|---|---|---|---|
| 4,392,145 | 7/1983 | Parkola | 346/140 |
| 4,414,553 | 11/1983 | Perna | 346/140 X |
| 4,415,909 | 11/1983 | Italiano et al. | 346/140 |
| 4,418,356 | 11/1983 | Reece | 346/140 |
| 4,424,520 | 1/1984 | Matsuda et al. | 346/140 |
| 4,455,560 | 6/1984 | Louzil | 346/140 |
| 4,468,680 | 8/1984 | Martner | 346/140 |
| 4,485,388 | 11/1984 | Sayko | 346/140 X |
| 4,499,478 | 2/1985 | Matsufuji et al. | 346/140 |
| 4,528,575 | 7/1985 | Matsuda | 346/140 |

FOREIGN PATENT DOCUMENTS 2256667 11/1972 Fed. Rep. of Germany .

*Primary Examiner*—Joseph W. Hartary

*Attorney, Agent, or Firm*—Melvin J. Scolnick; William D. Soltow, Jr.; Albert W. Scribner

[57] ABSTRACT

An ink jet printing head comprising an array of successive pairs of cavity plates and transducer plates. The transducer plates are one-piece elements composed of piezo-ceramic material and can have multiple diaphragms on opposing faces matching with cavities in the cavity plates. Many such pairs of cavity plates and transducer plates can be joined together to form a printing head which can achieve a very high density of nozzles, specifically, on the order of 150 to 200 nozzles per inch.

14 Claims, 9 Drawing Figures

INK JET ARRAY

BACKGROUND OF THE INVENTION

1. Field of the Invention

This invention relates to a printing head for a drop-on-demand ink jet printing apparatus and, more particularly, to a compact printing head utilizing an array of successive monomorphic transducer plates interleaved with matching cavity plates which cooperate to selectively eject ink droplets through an array of associated and closely spaced nozzles.

2. Description of the Prior Art

Printers and recorders of various types have been developed which employ a stream of discontinuous droplets. The ink is ejected through a small opening or nozzle as a result of the action of a transducer. A cavity is formed that is partially enclosed by a diaphragm of piezo-electric material to form a chamber. The piezo-electric material has the ability to change shape upon being charged electrically. A channel leads from the chamber to the opening and another channel leads to the chamber so that ink may be supplied thereto. A small charge is applied to the piezo-electric material to alter its shape and thereby cause a drop of ink to be ejected from the chamber and out through the nozzle.

Although prior systems have worked substantially well, improvements are always being sought. One goal consistently pursued is to have the openings of the ink jet printer as close to one another as possible. Obviously, by having the openings close together, one is able to produce more dots per unit area and obtain more refined printing. The barrier in having openings close together is the fact that each chamber of the ink jet printer requires a minimum amount of space. Various designs have been developed in order to have the openings close together.

One attempt has been to increase the number of lines of nozzles whereby the nozzles are staggered relative to one another to form two or more rows. A disclosure of this nature is found in the U.S. Pat. No. 4,418,356 to Reece. Although this has the advantage of having more nozzles per line, the disadvantage is that synchronization is required between the enabling of the piezo-electric elements and movement of the medium being printed with the result that the price must be paid in electronics.

Another way of attempting to increase the density of nozzles is to have elongated chambers as opposed to circular chambers. Such a construction is disclosed in the patent to Italiano et al, U.S. Pat. No. 4,415,909 which provides an arrangement of nozzles in a symmetrical pattern. The problem with this configuration is that efficiency is lost.

Another scheme attempted is to have not only longitudinally shaped chambers, but to have them in a fanning arrangement as disclosed by one of the embodiments of the patent to Martner, U.S. Pat. No. 4,468,680. The disadvantage with this configuration is not only the inefficiency as a result of having elongated chambers but also the fact that the chambers are further removed from the nozzles.

Yet another construction is disclosed in the patent to Louzil, U.S. Pat. No. 4,455,560, according to which the piezo-electric elements are staggered relative to one another. However, even such staggering does not provide a significant improvement in decreasing the mass of the overall print head.

More recently, a transducer to an ink jet printer has been developed according to which the chamber portion of the ink supply occupies significantly less space. In prior devices, the transducer was composed not only of a piezo-electric material but also included a diaphragm layer between the chamber and the piezo-electric material. The diaphragm was made of a conductive material such as metal and was used to control the movement of the piezo-electric material. However, as disclosed in commonly assigned copending applications, the diaphragm normally associated with the transducer is no longer required. These are, respectively, applications of Hubbard, Ser. No. 700,582, filed Feb. 11, 1985, entitled "Single Element Transducer For An Ink Jet Device" and of Cruz-Uribe et al, Ser. No. 772,109, filed 9-3-85, entitled "Notched Piezo-electric Transducer For An Ink Jet Device". Rather, as disclosed in each of the aforesaid applications, the pressure pulsing is accomplished by using a ceramic piezo-electric element that has either a notched configuration or a dome-shaped configuration. Furthermore, the chamber portion of the ink supply utilized with the one element transducer also occupies less space thereby achieving a two-fold reduction in the space necessarily occupied by the transducer.

Thus, throughout the specification, the terms "monomorph" and "monomorphic" refer to a one-piece transducer used to create the pressure for the ink droplets. Such a one-piece construction is in contrast with "Biomorph" (a trademark of the Clevite Corporation of Cleveland, Ohio) or "biomorphic" transducers which are of two-piece construction utilizing a piezo-electric crystal bonded to a diaphragm of conductive material.

SUMMARY OF THE INVENTION

It was with knowledge of the prior art, as noted above, and especially by reason of the more recent developments which were just mentioned, that the present invention was conceived and has now been reduced to practice. According to the invention, a piezo-electric crystal wafer or plate is fabricated to contain a number of shaped depressions on both faces. When interleaved with matching cavity plates, closely spaced nozzle arrays can be made of any length, depending upon the number of laminations. By reason of the invention, a very high density of nozzles can be achieved, specifically, on the order of 150 to 200 nozzles per inch. Suitable spaces can be provided between successive transducer plates to accommodate the electrical leads of a flexible conductor and a suitable construction for joining and holding the successive plates together is provided. In one embodiment, connecting rods utilized for such a purpose also serve as a manifold to supply each of the cavities with printing ink.

Other and further features, advantage, and benefits of the invention will become apparent from the following description taken in conjunction with the following drawings. It is to be understood that both the foregoing general description and the following detailed description are exemplary and explanatory but are not restrictive of the invention. The accompanying drawings, which are incorporated in and constitute a part of this invention, illustrate some of the embodiments of the invention and, together with the description, serve to explain the principles of the invention in general terms.

DETAILED DESCRIPTION OF THE PREFERRED EMBODIMENT

Figure 1:
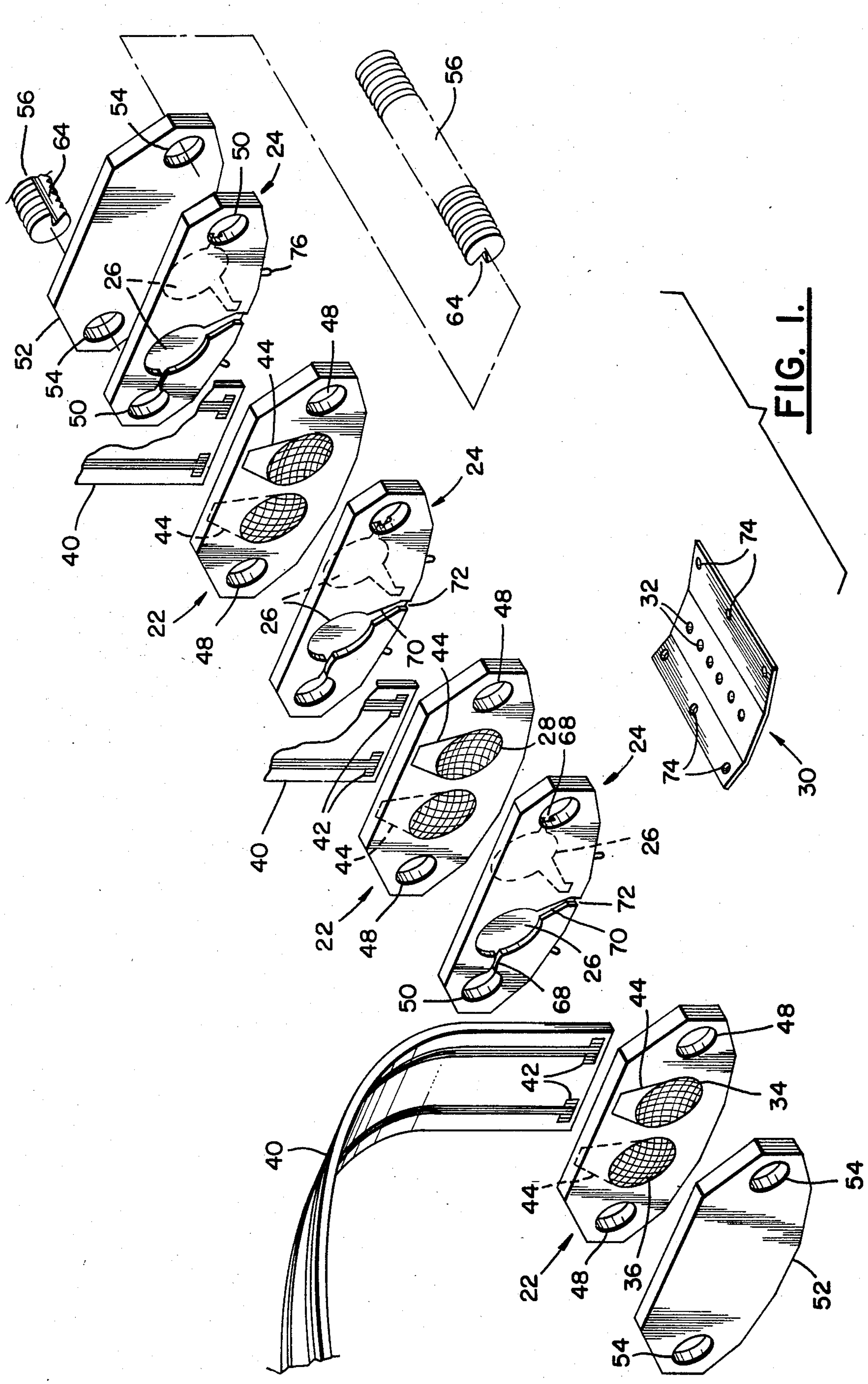
FIG. 1 is an exploded view in perspective of an ink jet printing head embodying the present invention.
Figure 2:
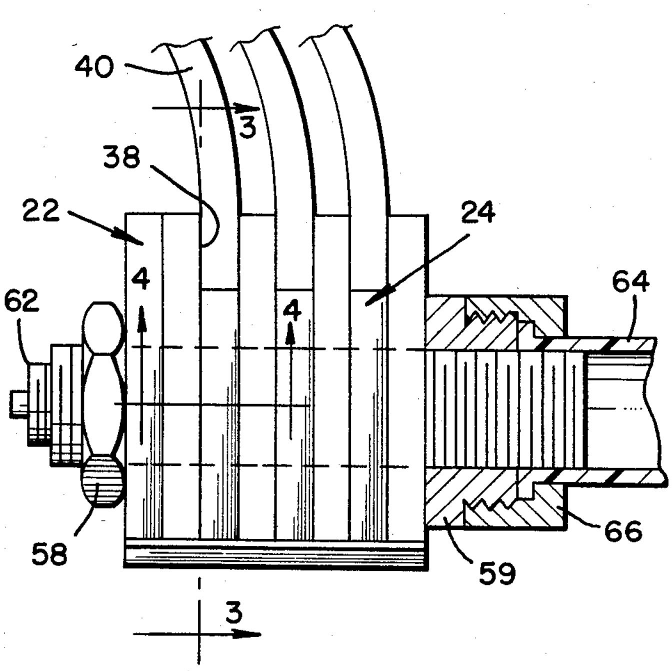
FIG. 2 is a side elevation view of the ink jet printing head illustrated in FIG. 1, certain parts being cut away and in section.

Turn now, initially, to FIGS. 1 and 2 which disclose an ink jet printing head 20 constructed in accordance with the present invention.

The head 20 employs an arrangement of alternating transducer wafers or plates 22 and cavity plates 24. The transducer plates 22 are composed of piezo-ceramic material in accordance with the disclosure provided by the Patent Applications Ser. Nos. 700,582 and 772,109 as referred to above. By way of example, the plates 22 may have a nominal thickness of 0.008 inches.

For their part, the cavity plates 24 can be composed of stainless steel, nickel, or etched glass generally having the nature of a material marketed by Corning Glass Works under the trademark of "FotoCeram". A typical nominal thickness for a cavity plate 24 as utilized by the invention would be 0.012 inches. The cavity plates 24 contain a pattern of ink cavities or chambers 26 which match with depressions in the transducer plates 22 defining monomorphic driver mechanisms 28 which, together with a nozzle plate 30 having a plurality of cooperatively placed nozzles 32 therein result in a compact stack or array of elements which can eject droplets of ink to a writing surface according to a preselected format.

One principal novelty of the invention resides in the monomorphic drive mechanisms 28 being placed on both sides of the transducer plate 22. In the arrangement illustrated in FIG. 1, two cavities 26 and associated driver mechanisms 28 are illustrated for each laminated pair. Such a construction would be suitable for many applications, including the printing head of a postage meter such as that disclosed in U.S. Pat. No. 3,869,986. As particularly well seen in FIGS. 1 and 4, the concave or domed face 34 of one driver mechanism 28 matches, or is generally coextensive with, an associated ink cavity 26. Similarly, on the opposite face of the crystal or transducer plate 22 is machined a recessed convex surface 36 so as to provide a shallow circular dome of essentially constant wall thickness. The shape of the driver mechanism 28 need not necessarily be circular with a spherical depression. It may take the shape of a rectangle, a cylinder or some other form.

Figure 4:
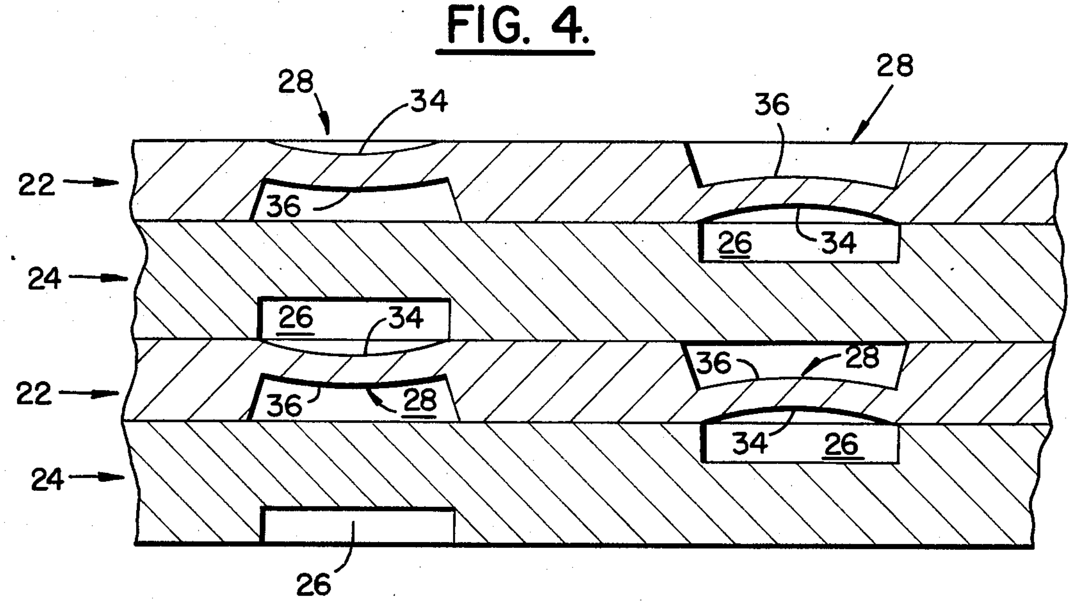
FIG. 4 is a cross section view taken generally along line 4—4 in FIG. 2.

As illustrated in FIGS. 1 and 4, each transducer plate 22 is provided with a pair of driver mechanisms 28, but facing in opposite directions. Thus, one driver mechanism 28 of a transducer plate 22 cooperates with a cavity 26 of a cavity plate 24 located on one side thereof, and the other driver mechanism 28 cooperates with a cavity 26 and a cavity plate 24 positioned on the other side thereof.

Figure 6:
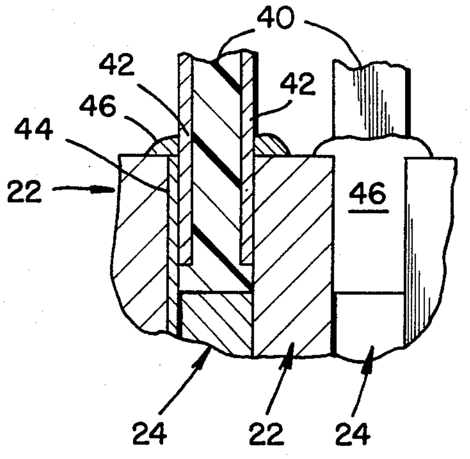
FIG. 6 is a detailed side elevation view of a portion of FIG. 2, certain parts being cut-away and in section.

Turning now to FIGS. 2 and 6, it is seen that the upper edges of the transducer plates 22 extend beyond the upper edges of the cavity plates 24 when the printing head 20 is fully assembled. Thus, spaces 38 are formed so as to receive the ends of suitable flexible cable 40 provided with a spaced pair of conductor terminals 42. The terminals 42 are adapted to make contact with a respective pair of electrodes 44 which are alternatively plated on the front end rear face of each transducer plate 22. The electrodes 44 lead to an edge of the transducer plate 22 which is in a direction away from the nozzle plate 30. Hence, conductor terminals 42 of one cable 40 actually serve to energize driver mechanisms 28 in a separated pair of transducer plates 22, one driver mechanism in each such plate. A suitable electrically conductive epoxy is used to fill the interstices of the spaces 38 and hold the terminals 42 in position as illustrated in FIG. 6.

On both sides of the plates 22 and 24, spaced from the cavities 26 and driver mechanisms 28, through holes 48 and 50, respectively, are formed in the transducer plates 22 and cavity plates 24. The printing head 20 is also provided with a pair of clamping or pressure plates 52, one located at either end of the array. The clamping plates are preferably sized and shaped to be the same as the transducer plates 22 and are similarly formed with aligned through holes 54 which match with the holes 48 and 50.

The elongated rods 56 are fittingly received and extend through the holes 48, 50, and 54 of their associated plates. As particularly well illustrated in FIG. 2, the ends are suitably threaded to receive fastening nuts 58 and 59 thereon. Also, as seen in FIG. 1, a longitudinally extending groove 60 is formed in each rod 56. Fluid flow is prevented at one end of each rod 56 by means of a suitable plug 62 while a suitable conduit 64 leading to a remote reservoir (not shown) of printing ink is connected to the other end of the rod 56 by an appropriate fitting 66 threadedly engaged with the nut 59. Thus, the rods 56 serve to align the array of plates, and simultaneously, serve to provide a manifold to supply ink to each of the cavities 26.

Figure 3:
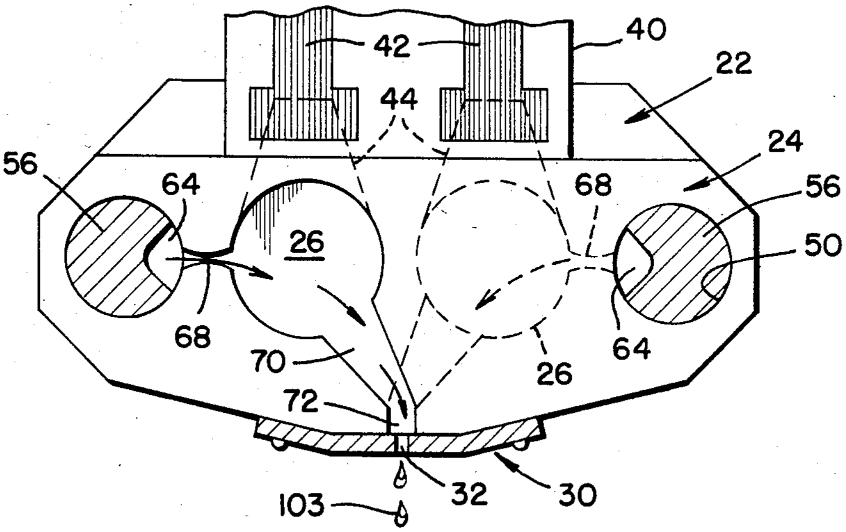
FIG. 3 is a cross section view taken generally along line 3—3 in FIG. 2.

Viewing FIG. 3, a first channel 68 is seen to connect the conduit 64 with the cavity 26 and is shown to be necked down so as to also serve as a restrictor to assure the necessary back pressure to enable the ejection of a droplet of ink from a nozzle 32. With continuing reference to FIG. 3, a second channel 70 is associated with each cavity 26 and is seen to extend from the cavity 26 to the lowermost portion of the plate 24. Typically, but not intended to be restrictive of the invention, each second channel may have a depth of 0.008 inches and taper from a wide region at the cavity 24 to a restricted region having an approximate width of 0.010 inches at the lowermost edge of the cavity plate 24. This, then, would result in a rectangular opening at the base of the plate 24 having dimensions of 0.008 inches by 0.010 inches. This opening is referred to as aperture 72.

Figure 5:
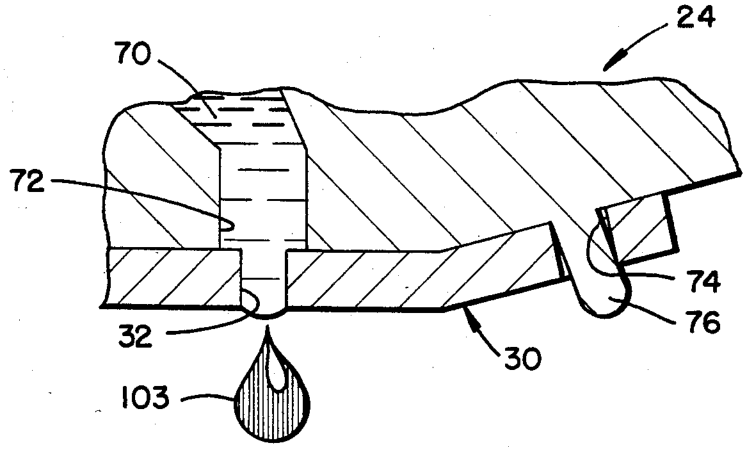
FIG. 5 is a detailed cross section view of a portion of FIG. 3 but enlarged many times.

Turn now especially to FIGS. 1, 3, and 5 which illustrate the nozzle 30 and its manner of attachment to the array of plates 22 and 24. The nozzle plate 30 is preferably in the form of a foil, composed of stainless steel or nickel and having a thickness of 2 to 3 mils and, as such, is relatively malleable. The nozzles 32 may be suitably formed as by punching, drilling, electroforming, or in any other suitable fashion. The diameter of a nozzle may typically be 0.002 inches. As illustrated in FIGS. 1 and 5, the nozzle plate 30 may also be formed with a plurality of holes 74 adjacent its edges for reception over appropriately formed and sized posts 76 integral with and extending downwardly and outwardly from the bottom edge of the cavity plates 24. According to one method of assembly, with the plates 22 and 24 in a contiguous relationship as illustrated in FIG. 2, the holes 74 along one edge of a nozzle plate 30 are received over their matching posts 76. The nozzle plate 30 is then stretched so that the holes 74 at the opposite edge of the nozzle plate 30 can be similarly mounted onto their associated posts 76 at the other sides of the plates 24. It will be noted that the bottom edges of the plates 22 and 24 generally form a dihedral with the apertures 72 at the apex. This serves thereof to assure that those portions of the nozzle plate 30 with the nozzles 32 formed therein will move to a contiguous relationship with the cavity plates 24 such that each nozzle 32 is properly aligned with its associated aperture 72 at the terminus of its second channel 70. It will be appreciated that there is some tolerance built into the construction described in that the aperture 72 is described as typically having a rectangular cross-section dimensioned at 0.008 inches by 0.010 inches while each nozzle has a diameter of approximately 0.002 inches.

In order to assure the fluid integrity of the system, the surfaces of each of the plates 22, 24, and 52 may be provided with a resin coating using a substance such as Teflon, manufactured and marketed by Du Pont de Nemours & Company. A desired thickness would 0.10 mils or approximately such a thickness as necessary to overcome surface roughness. It might also be desirable to apply a contact cement to the surfaces of the plates 22, 24, and 52. This could be by way of a film of adhesive which would be sprayed on, possibly to the thickness of approximately 0.25 mils. By such expedients, ink would be properly contained within the channels 68 and 70 and the cavities 26.

Figure 7:
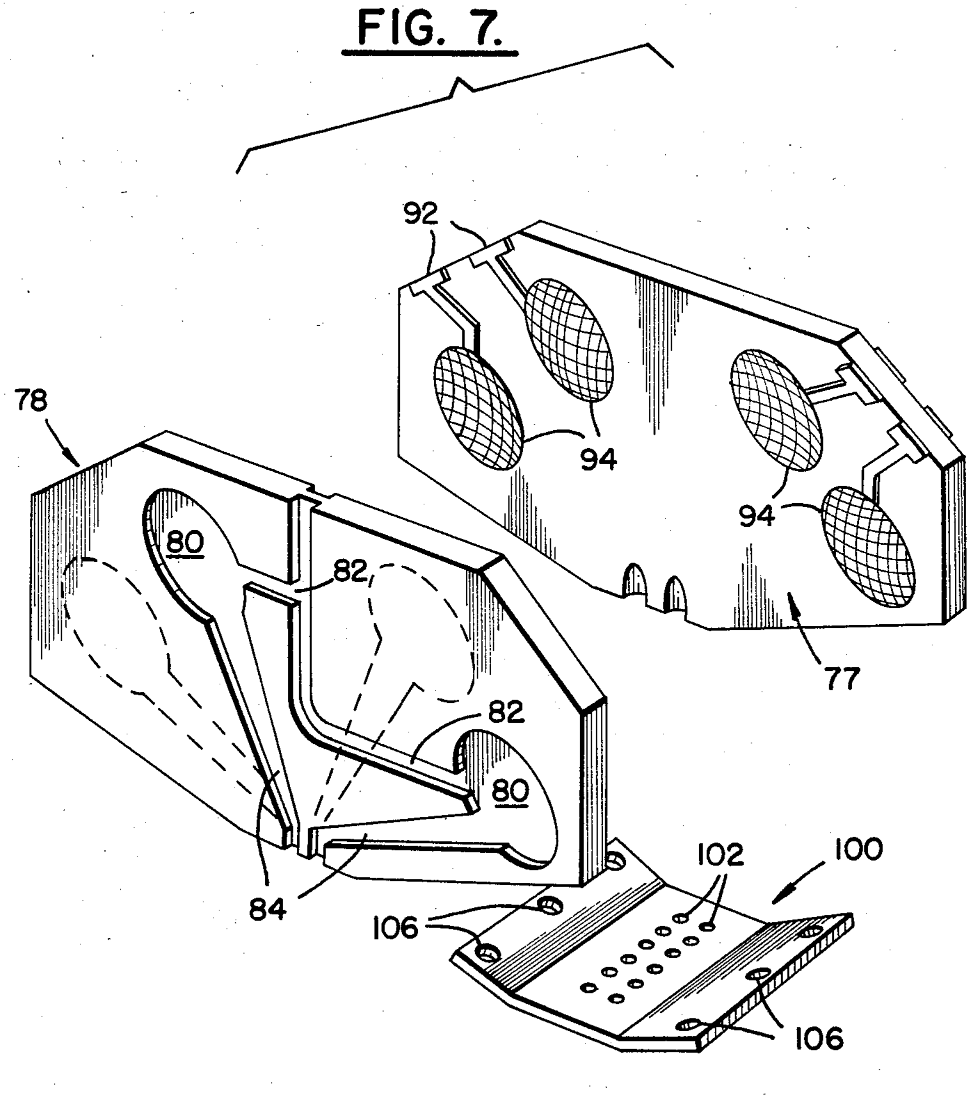
FIG. 7 is an exploded view, in perspective, illustrating parts of another embodiment of the invention.
Figure 8:
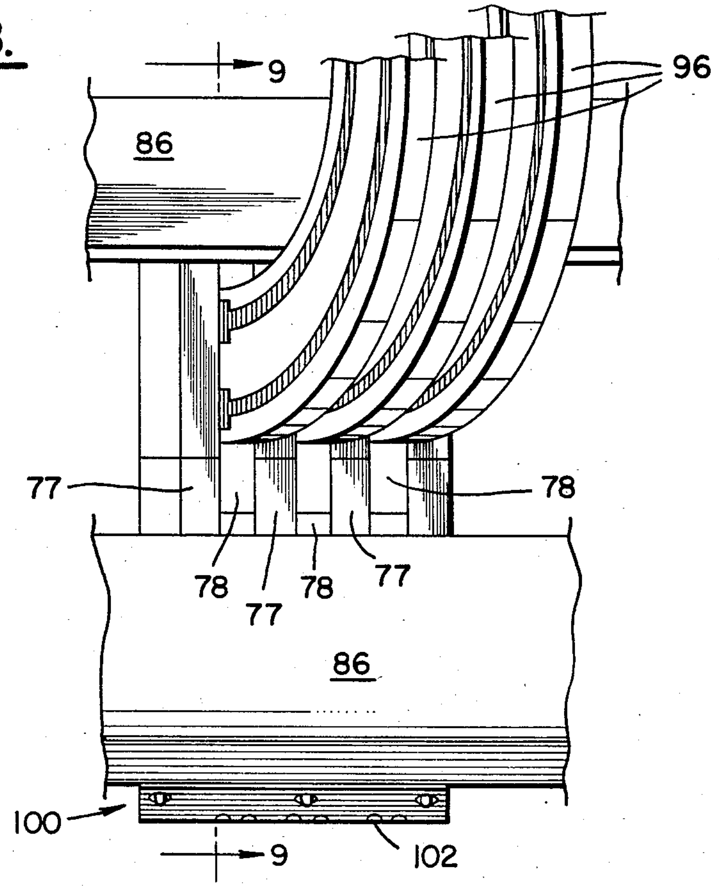
FIG. 8 is a side elevation view of an assembled ink jet printing head incorporating the components illustrated in FIG. 7.
Figure 9:
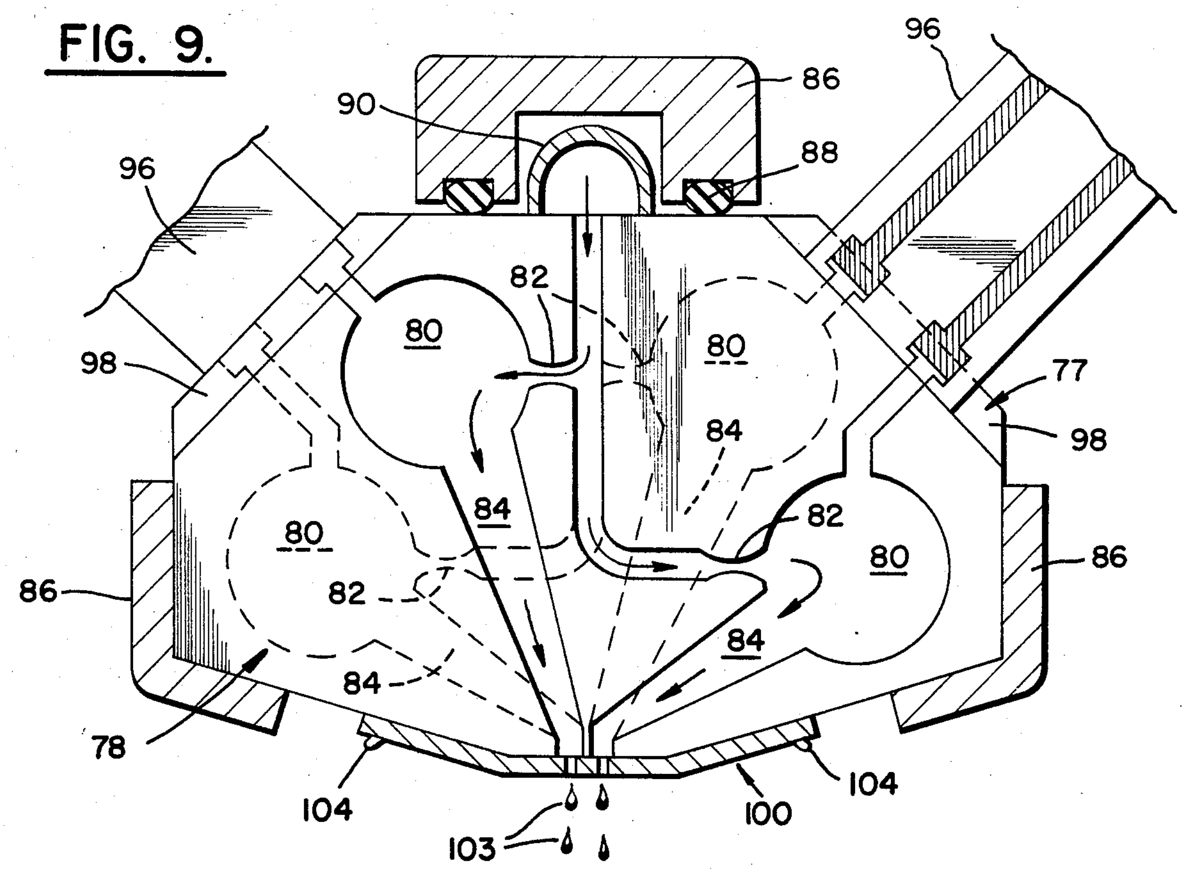
FIG. 9 is a cross section view taken generally along line 9—9 in FIG. 8.

By way of example, if the area of the driver mechanism 28 having a nominal diameter of 0.080 inches would be sufficient to provide the necessary displacement of pressure to desirably eject droplets through the nozzles 32, then the total area for a transducer plate 22 may be as little as approximately 0.360 inches by 0.180 inches. It is contemplated that a two inch square wafer of the piezo-ceramic or monomorphic material can thereby yield about 60 small transducer plates 22. All plating and machining operations are preferably performed on the large wafer before it is diced into individual elements. Continuing with the example, a nozzle array having a pitch of 100 per inch would typically require transducer plates, as mentioned previously, having a thickness of approximately 0.008 inches and cavity plates 24 having a thickness of approximately 0.012 inches. Turn now to FIGS. 7–9 for the description of another embodiment of the invention. As with the previous embodiment, the embodiment illustrated in FIGS. 7–9 employs the same concept of placing transducer cavity on both sides of a transducer plate 77. However, in the instance of this second embodiment, a cavity plate 78 contains 4 cavities 80, two on each face of the plate with appropriate ink supply and nozzle channels 82 and 84, respectively. Alignment may be by way of corner registration in a suitable frame 86 with elastomeric members 88 bearing down on upper services of the plates 77 and 78 and firmly into engagement with the lower portions of the frame 86. An ink supply manifold 90 may be glued or otherwise attached to the upper edges of the array of plates 77 and 78 for directing flow of printing ink from a reservoir (not shown) into the supply channels 82. Electrodes 92 are associated with each of the monomorphic driver mechanisms 94 and formed in the transducer plate 77. They may be suitably connected to the leads of a flexible conduit 96 received in a space 98 formed between adjoining successive transducer plates 77 where they are separated by a cavity plate 78.

A nozzle plate 100 is illustrated as being formed with a double row of nozzles 102 enabling ejection of a double row of droplets 103. The nozzle plate 100 is attached to the bottom edges of the array of plates 77 and 78 in a manner similar to that previously described and utilizing spaced apart posts 104 and cooperating holes 106. The nozzles 102 are in double rows by reason of the fact that the cavity plates 78 are formed with a pair of nozzle channels 84 on each surface thereof such that at any given station along the array, there are indeed two nozzles 102. In this fashion, the nozzle density can be doubled from that disclosed with regard to the earlier described embodiment. Thus, if the same thicknesses are utilized for the transducer plate 77 and cavity plate 78 as for the plates 22 and 24, then a density of 200 nozzles per inch can be achieved. It may be desirable to relieve some of the fabrication tolerances that would be required. Thus, the transducer and cavity plates with respectiveness thicknesses of 0.011 inches and 0.016 inches, respectively, would yield an array of nozzles at a pitch of 150 per inch. Further multiplexing of the stack of array of plates is possible. This would require a more complex nozzle array with two level etching to provide a three-way stagger. With six transducers per pair of plates, and 150 nozzles per inch as a pitch, the material thickness for transducer plates and cavity plates would then be approximately 0.015 inches and 0.025 inches, respectively.

While the preferrd embodiments of the invention have been disclosed in detail, it should be understood by those skilled in the art that various modifications may be made to the illustrated embodiments without departing from the scope thereof as described in the specification and defined in the appended claims.

We claim:

1. An ink jet printing head comprising:

a plurality of successive pairs of first and second plates in an alternating sequence;

means joining said first and second plates in contiguous side by side relationship;

each of said first plates having at least one cavity therein adapted to receive printing ink therein, a first channel extending between the cavity and a source of supply of printing ink, and a second channel extending between the cavity and a nozzle through which the ink can be ejected in droplet form;

each of said second plates including monomorphic transducer means generally overlying each cavity in said first plate to form a chamber therewith and operable to induce pulsed pressure waves to the ink in its associated chamber to draw ink from the source of supply and eject it through the nozzle in droplet form, said second plates being effective, when held in contiguous side by side relationship against said first plates by said joining means, to confine the ink in said printing head to the chamber and each of said first and second channels.

2. An ink jet printing head comprising:

a plurality of successive pairs of first and second plates in an alternating sequence;

means joining said first and second plates in contiguous side by side relationship;

each of said first plates having oppositely directed faces;

each of said faces having at least one cavity therein adapted to receive printing ink therein, a first channel extending between each cavity and a source of supply of printing ink, and a second channel extending between each cavity and an associated nozzle through which the ink can be ejected in droplet form;

each of said second plates including a monomorphic transducer means generally overlying each cavity in an associated one of said sides in said first plate to form a chamber therewith and operable to induce pulsed pressure waves to the ink in its associated chamber to draw ink from the source of supply and eject it through the associated nozzle in droplet form, said second plates being effective, when held in contiguous side by side relationship with said first plates by said joining means, to confine the ink in said printing head to each associated chamber and each of said associated first and second channels.

3. An ink jet printing head as set forth in claim 2 including a nozzle plate extending generally transverse of said first and second plates and having a plurality of nozzles therein, said nozzle plate being mounted proximate to said plurality of successive pairs of said first and second plates such that each nozzle is aligned with an associated one of the second channels in each said first plates.

4. An ink jet printing head as set forth in claim 2 wherein said monomorphic transducer means is a ceramic piezo-ceramic element and including means for supplying an electric charge to said element.

5. An ink jet printing head as set forth in claim 2 wherein said joining means includes a frame for relatively aligning said first and second plates.

6. An ink jet printing head as set forth in claim 5 including an ink manifold communicating with an ink reservoir and connecting with said first channel in each of said first plates.

7. An ink jet printing head as set forth in claim 2 wherein said monomorphic transducer means is a ceramic piezo-ceramic element and including an electrode associated with each of said elements for supplying an electric charge thereto, successive pairs of said second plates defining therebetween a space for reviewing electrical conductors to connect each of said electrodes to a source of electric charges.

8. An ink jet printing head as set forth in claim 2 wherein each of said first and second plates has at least a pair of spaced apart holes therein and wherein said joining means includes:

a pair of clamping plates between which all of said first and second plates are sandwiched, each of said clamping plates having at least a pair of spaced apart holes therein aligned with the holes in each of said first and second plates;

elongated rods extending through the holes in said first and second and clamping plates and having ends projecting beyond said clamping plates; and fastener means releasably attachable to said ends of said rods effective to firmly hold all of said plates in contiguous side by side relationship.

9. An ink jet printing head as set forth in claim 8 wherein said ends of said rods are threaded and wherein said fastener means are nuts threaded received on said ends of said rods.

10. An ink jet printing head as set forth in claim 8 wherein each of said rods has a longitudinally extending groove connecting at one end to an ink reservoir and in communication along its length with each of said first channels.

11. An ink jet printing head wherein a plurality of monomorphic transducer plates are interleaved with a like plurality of cavity plates having at least one cavity on each opposed face thereof adapted to receive printing ink from a source of supply and to direct it to a nozzle through which it can be ejected in droplet form, each of said transducer plates having opposed surfaces and an integral crystal on each of said opposed surfaces extending over an associated cavity to form a chamber therewith, said crystal having a curvilinear configuration at the location of each of the cavities.

12. An ink jet printing head as set forth in claim 11 wherein said integral crystal is a ceramic piezo-ceramic element and including means for supplying an electric charge to said element.

13. An ink jet printing head as set forth in claim 11 wherein said curvilinear configuration is convex.

14. An ink jet printing head as set forth in claim 11 wherein said convex configuration is directed away from said recess.

* * * * *